US012731823B2

(12) United States Patent
Kim et al.

(10) Patent No.: US 12,731,823 B2
(45) Date of Patent: Sep. 8, 2026

(54) POUCH CASE AND SECONDARY BATTERY USING THE SAME

(71) Applicant: SK ON CO., LTD., Seoul (KR)

(72) Inventors: Tae Il Kim, Daejeon (KR); Sung Yeop Kim, Daejeon (KR); Won Seok Jeong, Daejeon (KR)

(73) Assignee: SK On Co., Ltd., Seoul (KR)

( * ) Notice: Subject to any disclaimer, the term of this patent is extended or adjusted under 35 U.S.C. 154(b) by 267 days.

(21) Appl. No.: 18/602,484

(22) Filed: Mar. 12, 2024

(65) Prior Publication Data

US 2024/0222734 A1 Jul. 4, 2024

Related U.S. Application Data

(63) Continuation of application No. 17/549,546, filed on Dec. 13, 2021, now Pat. No. 11,961,981, which is a (Continued)

(30) Foreign Application Priority Data

Jun. 22, 2018 (KR) ........................ 10-2018-0072245
Dec. 3, 2018 (KR) ........................ 10-2018-0153314

(51) Int. Cl.
*H01M 10/613* (2014.01)
*H01M 10/647* (2014.01)
(Continued)

(52) U.S. Cl.
CPC ....... *H01M 10/613* (2015.04); *H01M 10/647* (2015.04); *H01M 10/6554* (2015.04); (Continued)

(58) Field of Classification Search
CPC .. H01M 10/04; H01M 10/613; H01M 10/647; H01M 10/6554; H01M 50/105; (Continued)

(56) References Cited

U.S. PATENT DOCUMENTS

2010/0279152 A1* 11/2010 Payne ................. H01M 50/211 429/50
2019/0312237 A1* 10/2019 Moon .................. H01M 10/52

FOREIGN PATENT DOCUMENTS

KR 10-2018-0020547 A 2/2018

OTHER PUBLICATIONS

Notice of Allowance for Korean Patent Application No. 10-2018-0153314 issued by the Korean Patent Office on May 18, 2024.

* cited by examiner

*Primary Examiner* — Daniel S Gatewood
(74) *Attorney, Agent, or Firm* — IP & T GROUP LLP

(57) ABSTRACT

Provided are a pouch case and a secondary battery using the same. The pouch case includes a first receiving part and a second receiving part which are concavely formed; a sealing part formed along an outer portion of the pouch case so as to surround the first receiving part and the second receiving part; and a partitioning part formed between the first receiving part and the second receiving part and protruding from a bottom surface of each receiving part to partition the first receiving part and the second receiving part. As one side surface of the secondary battery in which an electrode assembly is received and packaged in the pouch case is formed in a plane form, a flat side surface is in close contact with a cooling plate, thereby maximizing cooling efficiency of the secondary battery.

8 Claims, 18 Drawing Sheets

Related U.S. Application Data continuation of application No. 16/438,192, filed on Jun. 11, 2019, now Pat. No. 11,251,479.

(51) Int. Cl.

| | |
|---|---|
| ***H01M 10/6554*** | (2014.01) |
| ***H01M 50/105*** | (2021.01) |
| ***H01M 50/548*** | (2021.01) |
| ***H01M 50/553*** | (2021.01) |
| ***H01M 50/557*** | (2021.01) |

(52) U.S. Cl.

CPC ....... *H01M 50/105* (2021.01); *H01M 50/557* (2021.01); *H01M 50/548* (2021.01); *H01M 50/553* (2021.01)

(58) Field of Classification Search

CPC ............. H01M 50/119; H01M 50/121; H01M 50/124; H01M 50/178; H01M 50/184; H01M 50/211; H01M 50/548; H01M 50/553; H01M 50/577; Y02E 60/10; Y02P 70/50

See application file for complete search history.

A - A'

POUCH CASE AND SECONDARY BATTERY USING THE SAME

CROSS-REFERENCE TO RELATED APPLICATIONS

This application is a continuation of U.S. patent application Ser. No. 17/549,546 filed on Dec. 13, 2021. U.S. patent application Ser. No. 17/549,546 is a continuation of U.S. patent application Ser. No. 16/438,192 filed on Jun. 11, 2019 and issued as U.S. Pat. No. 11,251,479 on Feb. 15, 2022, which claims priority under 35 U.S.C. § 119 to Korean Patent Application No. 10-2018-0072245, filed on Jun. 22, 2018, and No. 10-2018-0153314 filed on Dec. 3, 2018, in the Korean Intellectual Property Office. The entire disclosure of each of the foregoing applications is incorporated herein by reference in its entirety.

TECHNICAL FIELD

The following disclosure relates to a pouch case and a secondary battery using the same, and more particularly, to a pouch case that may improve cooling efficiency by allowing one side surface of the secondary battery using the pouch case to be in close contact with a cooling plate, and the secondary battery using the same.

BACKGROUND

In general, a lithium secondary battery may be classified into a can type secondary battery in which an electrode assembly is embedded in a metal can, and a pouch type secondary battery in which the electrode assembly is embedded in a pouch case, which is an aluminum laminate sheet, depending on a shape of a case.

The lithium secondary battery is widely used not only for small mobile devices but also for medium and large devices such as automobiles and power storage devices. In this case, a plurality of pouch type secondary batteries, which are easy to stack and light in weight, are connected and used to increase capacity and output.

However, in the case in which a battery module is configured by stacking the plurality of pouch type secondary batteries, since heat generated from the plurality of secondary batteries is added up to quickly raise a temperature of the battery module, it is very important to ensure stable and effective cooling performance when the battery module is configured by using the plurality of pouch type secondary batteries.

Therefore, as a cooling method having a simple structure while ensuring efficient cooling performance, a method of performing cooling by making a side surface portion of the pouch type secondary battery to be in direct contact with a surface of a cooling plate has recently been studied, but it is difficult to make the side surface portion of the pouch type secondary battery be effectively in close contact with the cooling plate due to a limitation of a shape of the pouch case.

In order to solve the above-mentioned problem, in U.S. Pat. No. 8,501,343 entitled "pouch-type battery", a pair of receiving parts are formed in a pouch case as one space while not being divided into independent spaces, but when the secondary battery is manufactured with the pouch case of such a shape, a problem occurs in which the pouch case is not folded or both ends of the side surface portion are dented outwardly during a process of folding the pouch case.

RELATED ART DOCUMENT

Patent Document

U.S. Pat. No. 8,501,343 B2 (2013.08.06.)

SUMMARY

An embodiment of the present invention is directed to providing a pouch case in which one side surface of the secondary battery is in close contact with a cooling plate to maximize cooling efficiency by allowing one side surface of the secondary battery using the pouch case to have a perfect cooling structure, and the secondary battery using the same.

In one general aspect, a pouch case for receiving and packaging an electrode assembly, includes: a first receiving part and a second receiving part which are concavely formed; a sealing part formed along an outer portion of the pouch case so as to surround the first receiving part and the second receiving part; and a partitioning part formed between the first receiving part and the second receiving part and protruding from a bottom surface of each receiving part to partition the first receiving part and the second receiving part, wherein the partitioning part includes: a first partitioning part having an upper end having a height lower than that of the sealing part and partitioning the first receiving part and the second receiving part at a middle of the partitioning part; a second partitioning part having an upper surface having the same height as that of the sealing part at both ends of the partitioning part; and a third partitioning part connecting the first partitioning part and the second partitioning part to each other.

The third partitioning part may be inclined toward the second partitioning part at an end portion of the first partitioning part in a length direction.

The third partitioning part may be connected to upper end portions of the second partitioning part and the first partitioning part in a round form.

The first partitioning part may include a curved part having an upper end portion formed in a curved cross section.

The first partitioning part may further include a plane part connecting the first receiving part and the second receiving part with the curved part in a linear form.

A length of a cross section of an upper side surface of the first partitioning part may be smaller than a sum of a depth of the first receiving part and a depth of the second receiving part.

In another general aspect, a secondary battery includes a pouch case and an electrode assembly, wherein the pouch case includes: a first receiving part and a second receiving part which are concavely formed; a sealing part formed along an outer portion of the pouch case so as to surround the first receiving part and the second receiving part; and a partitioning part formed between the first receiving part and the second receiving part and protruding from a bottom surface of each receiving part to partition the first receiving part and the second receiving part, wherein the partitioning part includes: a first partitioning part having an upper end having a height lower than that of the sealing part and partitioning the first receiving part and the second receiving part at a middle of the partitioning part; a second partitioning part having an upper surface having the same height as that of the sealing part at both ends of the partitioning part; and a third partitioning part connecting the first partitioning part and the second partitioning part to each other, and the electrode assembly is received and packaged in a receiving space formed by folding the partitioning part so that the first receiving part and the second receiving part of the pouch case face each other.

The first partitioning part may be unfolded and may be formed as a side surface part of a plane form, and the sealing part may include extending parts protruding in a direction perpendicular to the side surface part of the secondary battery at portions adjacent to both ends of the side surface part of the secondary battery.

A sum of a depth of the first receiving part and a depth of the second receiving part of the pouch case may be equal to a thickness of the electrode assembly.

The first partitioning part may be unfolded and may be formed as a side surface part of a plane form, and dimples of a concave form may be formed at both ends of the side surface part.

In another general aspect, a secondary battery pack includes: one or more secondary batteries; and a cooling plate including a surface which is in surface contact with side surface parts of the secondary batteries.

The sealing part may include extending parts protruding in a direction perpendicular to the side surface parts of the secondary batteries at portions adjacent to both ends of the side surface parts of the secondary batteries.

A width between a first side surface and a second side surface of the cooling plate may correspond to a length between the extending parts of the secondary batteries.

A width between a first side surface and a second side surface of the cooling plate may be greater than a length between the extending parts of the secondary batteries.

Each of the first side surface and the second side surface of the cooling plate may be formed with a step at a height which is greater than or equal to a length of the extending parts of the secondary batteries.

Each of the first side surface and the second side surface of the cooling plate may be formed with one or more grooves at a depth which is greater than or equal to a length of the extending parts so as to receive the extending parts of the secondary batteries.

DETAILED DESCRIPTION OF EMBODIMENTS

Embodiments of the present invention will be described in detail with reference to the accompanying drawings. The following detailed description is merely exemplary and is merely illustrative of embodiments of the present invention.

Figure 1:
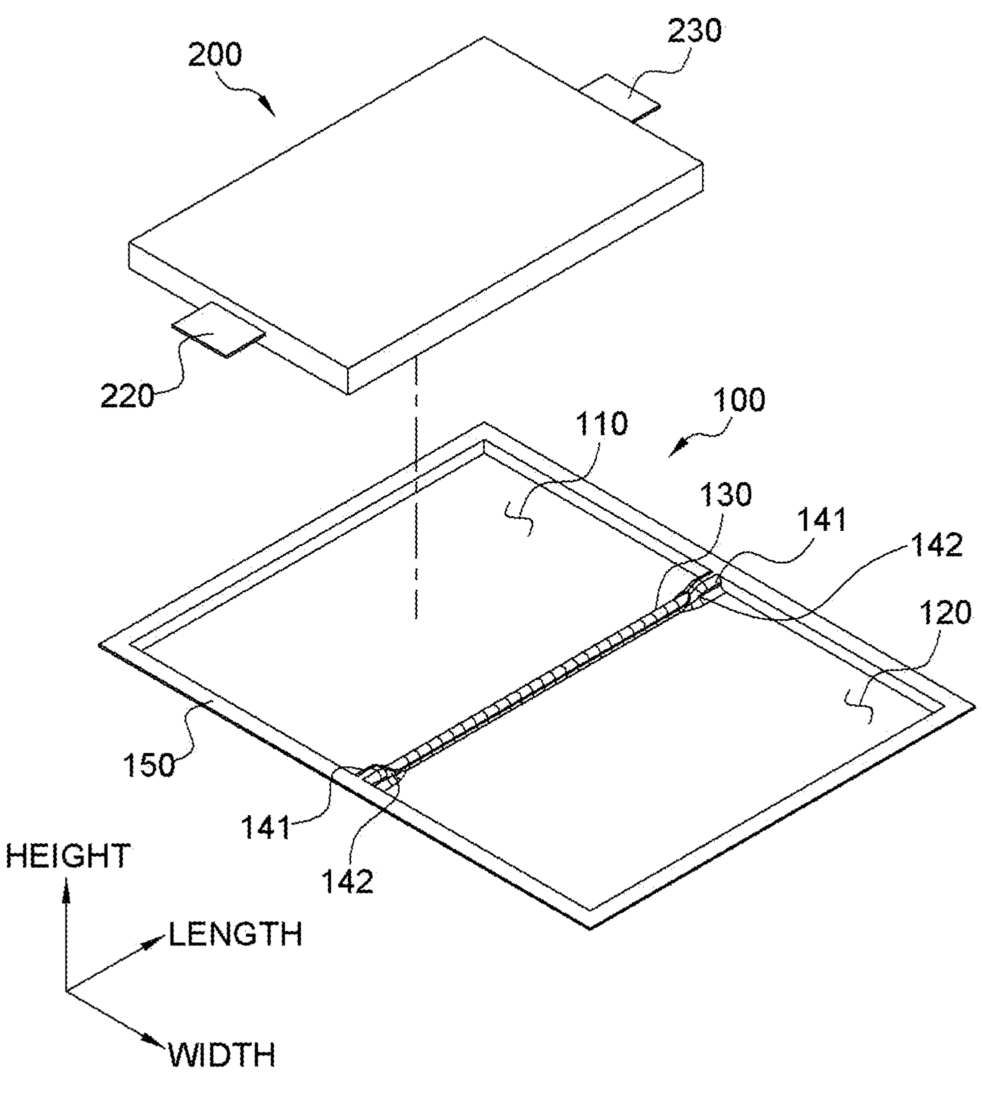
FIG. 1 is an exploded perspective view illustrating a secondary battery including an electrode assembly and a pouch case according to an embodiment of the present invention.

FIG. 1 is an exploded perspective view illustrating a secondary battery including an electrode assembly and a pouch case according to an embodiment of the present invention.

Referring to FIG. 1, a secondary battery 300 according to the present invention may include a pouch case 100 and an electrode assembly 200 including a plurality of electrode bodies stacked with a separator interposed therebetween. Here, the pouch case 100 is sealed and packaged with a sealing part 150 which receives and surrounds the electrode assembly 200 and is in contact with the electrode assembly 200.

A first electrode tab 220 and a second electrode tab 230 may be formed on both ends of the electrode assembly 200, and in FIG. 1, although the electrode tabs are formed in the form that protrudes from both side surfaces of the electrode assembly 200 in a horizontal direction, the secondary battery 300 according to the present invention does not limit a configuration of the electrode tabs thereto, and the first electrode tab 220 and the second electrode tab 230 may also be simultaneously disposed on any one side surface of the sealing part 150.

Figure 2:
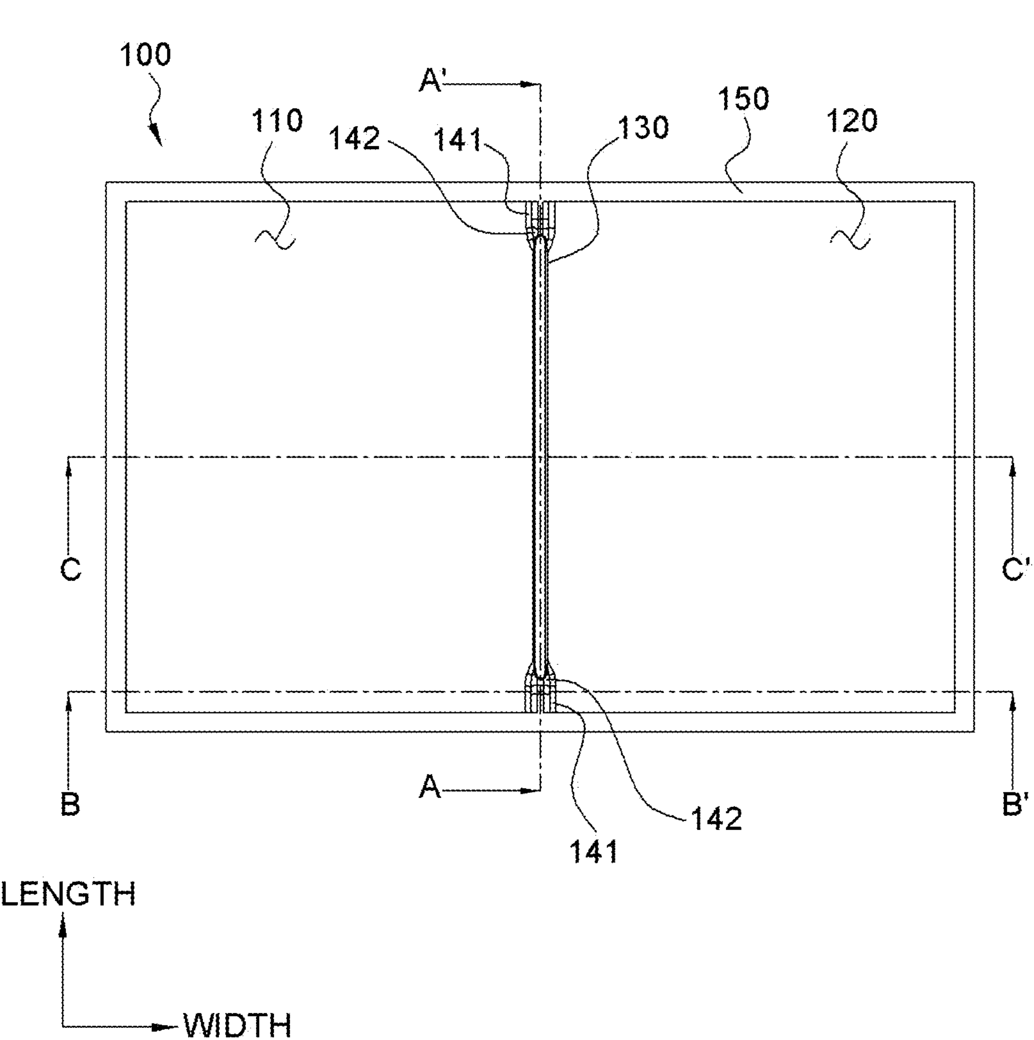
FIG. 2 is an upper plan view of the pouch case according to an embodiment of the present invention.
Figure 3:
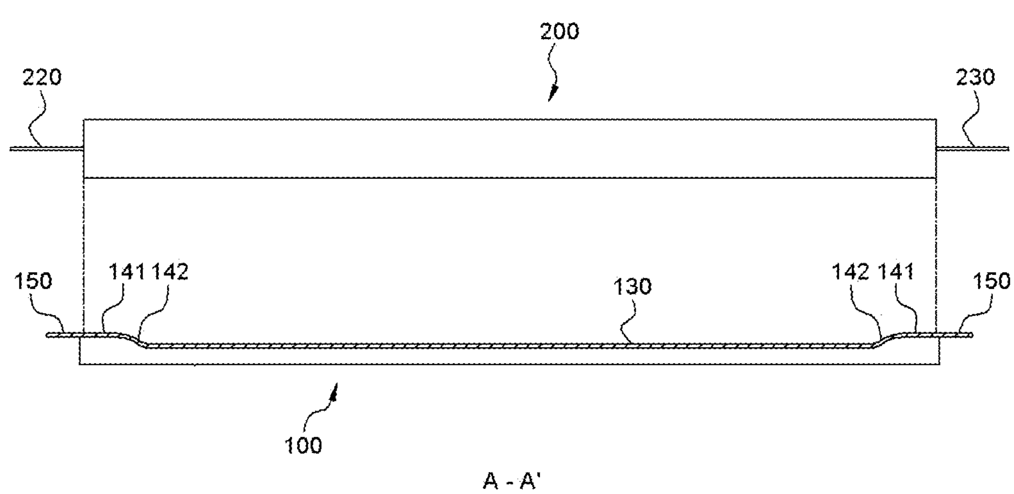
FIG. 3 is a cross-sectional view taken along line A-A' of FIG. 2.
Figure 3:
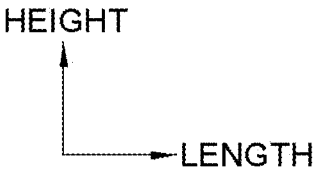
Figure 4:
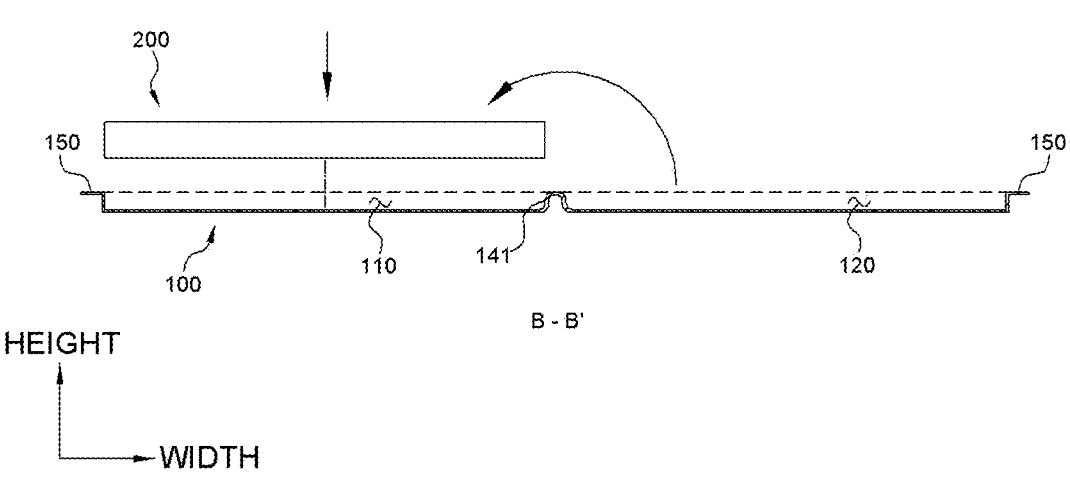
FIG. 4 is a cross-sectional view taken along line B-B' of FIG. 2.
Figure 5:
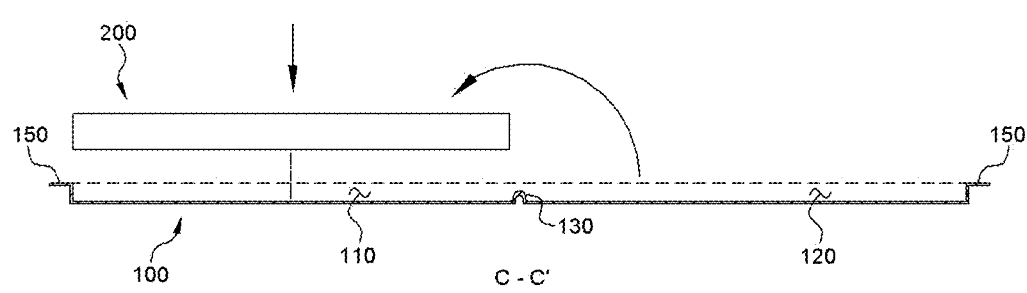
FIG. 5 is a cross-sectional view taken along line C-C' of FIG. 2.
Figure 5:
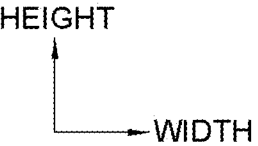

FIG. 2 is an upper plan view of the pouch case according to an embodiment of the present invention, FIG. 3 is a cross-sectional view taken along line A-A' of FIG. 2, FIG. 4 is a cross-sectional view taken along line B-B' of FIG. 2, and FIG. 5 is a cross-sectional view taken along line C-C' of FIG. 2.

Referring to FIGS. 2 to 5, the pouch case 100 according to an embodiment of the present invention may include a first receiving part 110 and a second receiving part 120 which are formed to receive the electrode assembly 200, the sealing part 150 formed along an outer portion of the pouch case 100 so as to surround the first receiving part 110 and the second receiving part 120, a first partitioning part 130 that protrudes upwardly from a bottom surface forming the first receiving part 110 and the second receiving part 120, that is, convexly from the bottom surface toward the inside of the first receiving part 110 and the second receiving part 120, has an upper end formed at a height lower than that of the sealing part 150, and partitions the first receiving part 110 and the second receiving part 120 at a predetermined interval, a second partitioning part 141 protruding from a side surface connected to the sealing part 150 and the bottom surface connected to the side surface, and a third partitioning part 142 connecting the first partitioning part 130 and the second partitioning part 141 to each other.

One first receiving part 110 and one second receiving part 120 for receiving the electrode assembly 200 may be formed in the pouch case 100. The first receiving part 110 and the second receiving part 120 are formed in a shape which is concavely recessed downwardly in a height direction of the pouch case 100 formed in a flat plate shape, and may be formed by pressing the inside of the pouch case 100 by pressing or the like. Here, each of the first receiving part 110 and the second receiving part 120 has a size corresponding to a width and a length of the electrode assembly 200, and a sum of depths of the first receiving part 110 and the second receiving part 120 may be formed to correspond to a thickness of the electrode assembly 200. In this case, the depths of the first receiving part 110 and the second receiving part 120 may be a linear distance from an upper surface of the sealing part 150 to the bottom surface of each of the first receiving part 110 and the second receiving part 120, and the depth of the first receiving part 110 may be uniformly formed in both the width direction and the length direction and the depth of the second receiving part 120 may also be uniformly formed in both the width direction and the length direction. In addition, although FIG. 1 illustrates that the depth of the first receiving part 110 and the depth of the second receiving part 120 are equal to each other, the depth of the first receiving part 110 and the depth of the second receiving part 120 may be different from each other.

The sealing part 150 refers to a portion that is not pressed and remains when the first receiving part 110 and the second receiving part 120 are formed by pressing the inside of the pouch case 100 formed in the flat plate shape by pressing or the like. That is, a portion formed along the outer portion of the pouch case 100 to surround the first receiving part 110 and the second receiving part 120 may be the sealing part 150.

The first partitioning part 130 is a portion that convexly protrudes upwardly in the height direction from the bottom surface between the first receiving part 110 and the second receiving part 120, and extends along the length direction to partition the first receiving part 110 and the second receiving part 120 in the width direction. Here, by pressing the pouch case in a state in which a convex portion corresponding to the first partitioning part 130 is formed in a lower mold when the first receiving part 110 and the second receiving part 120 are formed by pressing the inside of the pouch case 100 formed in the flat plate shape by pressing or the like, the first partitioning part 130 may be formed in a concave form on an outer side of the first receiving part 110 and the second receiving part 120 and may be formed in a convex form on an inner side thereof. In this case, an upper end of the first partitioning part 130 may have a height lower than that of the sealing part 150, and both ends of the first partitioning part 130 in the length direction may be formed up to positions spaced apart from both side surfaces of the first receiving part 110 and the second receiving part 120 in the length direction by a predetermined distance.

The second partitioning part 141 is a component for allowing both ends of a side surface part 310 of a secondary battery 300 in the length direction to be easily folded without being distorted when the sealing part 150 is folded to allow the first receiving part 110 and the second receiving part 120 to face each other so that the pouch case 100 forms a receiving space for receiving the electrode assembly 200. The second partitioning part 141 may protrude from both side surfaces of the first receiving part 110 and the second receiving part 120 in the length direction and a bottom surface portion connected to both side surfaces in the length direction, and may have an upper surface formed at the same height as that of the sealing part 150. Here, the second partitioning part 141 may be concave on the outer side of the first receiving part 110 and the second receiving part 120 and may be convex on the inner side thereof by pressing or the like in the manner similar to the first partitioning part 130. In addition, although it is illustrated that the second partitioning part 141 has a width greater than that of the sealing part 150, the second partitioning part 141 is not limited thereto, and it is possible to adjust the width of the second partitioning part 141 according to a thickness T and a shape of the electrode assembly 200 or according to a material of the pouch case 100.

The third partitioning part 142 is a portion that connects both end portions of the first partitioning part 130 in the length direction and the second partitioning part 141 to each other in a gentle form. The third partitioning part 142 may be concave on the outer side of the first receiving part 110 and the second receiving part 120 and may be convex on the inner side thereof by pressing or the like in the manner similar to the first partitioning part 130 and the second partitioning part 141, and the first partitioning part 130, the third partitioning part 142, and the second partitioning part 141 may be integrally formed to be connected to each other by pressing the pouch case in a state in which a convex portion is formed in the lower mold so as to correspond to the forms of the first partitioning part 130, the third partitioning part 142, and the second partitioning part 141. In this case, the third partitioning part 142 may be inclined upwardly from an upper end portion of the first partitioning part 130 in the length direction to an upper end portion of the second partitioning part 141 so that the upper end portion of the first partitioning part 130 and the upper end portion of the second partitioning part 141 are naturally connected to each other. In addition, a portion at which the third partitioning part 142 is connected to the upper end portion of the first partitioning part 130 and a portion at which the third partitioning part 142 is connected to the upper end portion of the second partitioning part 141 may be formed in a round form having a predetermined radius of curvature. In addition, both side surfaces of the third partitioning part 142 in the width direction may also be inclined from a side surface of an end portion of the first partitioning part 130 in the length direction to the side surface of the second partitioning part 141, and a connected portion may be formed in a round form.

As such, the second partitioning part 141, the third partitioning part 142, and the first partitioning part 130 are formed so as to be gently connected without having a discontinuous slope, thereby making it possible to obtain an effect of preventing the second partitioning part 141 and the third partitioning part 142 positioned on the side surface part 310 of the secondary battery 300 from being damaged or torn when the pouch case 100 is folded.

Figure 6:
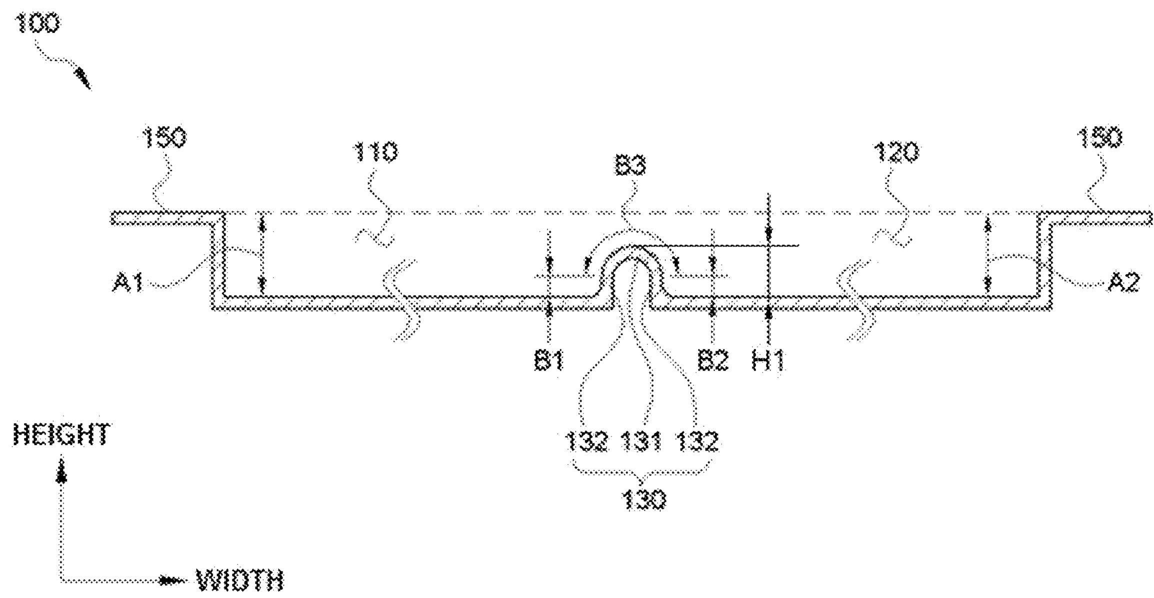
FIG. 6 is an enlarged view of FIG. 5.

FIG. 6 is an enlarged view of FIG. 5.

Referring to FIG. 6, the first partitioning part 130 is a component for separating the first receiving part 110 and the second receiving part 120 from each other at a predetermined interval and connecting them to each other, and extends bottom surfaces of the first receiving part 110 and the second receiving part 120 and connects the bottom surfaces to each other. Here, one side of the first partitioning part 130 is connected to the bottom surface of the first receiving part 110, and the other side of the first partitioning part 130 is connected to the bottom surface of the second receiving part 120. In addition, the upper end of the first partitioning part 130 may have a height lower than that of the sealing part 150, and the first receiving part 110 and the second receiving part 120 are partitioned by the first partitioning part 130. In addition, as shown, the first partitioning part 130 may have a plane part 132 which is upwardly extended in a linear form from the bottom surface of the first receiving part 110, a plane part 132 which is upwardly extended in a linear form from the bottom surface of the second receiving part 120, and a curved part 131 formed in a semi-circular form on an upper end of a pair of plane parts 132.

Thereby, when the secondary battery 300 is manufactured using the pouch case 100 according to the first embodiment of the present invention, the pouch case 100 may be packaged to receive the electrode assembly 200 in the receiving space formed by folding the first receiving part 110 and the second receiving part 120 along a center line of the first partitioning part 130 so as to face each other and to then seal the overlapped sealing part 150. Here, the first partitioning part 130 may be supported and unfolded by the electrode assembly 200 received in the receiving space when the pouch case 100 is folded.

Figure 7:
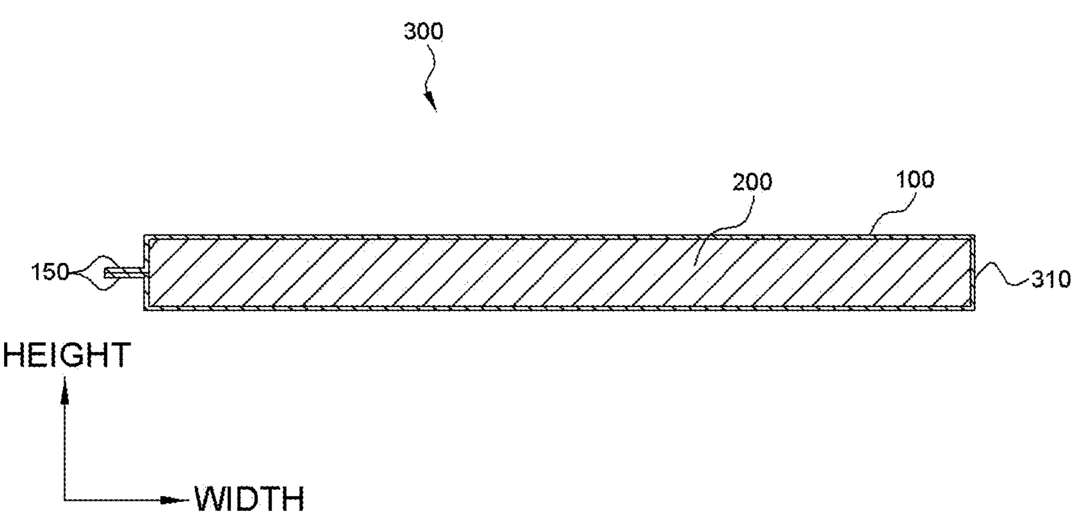
FIG. 7 is a cross-sectional view illustrating a secondary battery according to an embodiment of the present invention.
Figure 8:
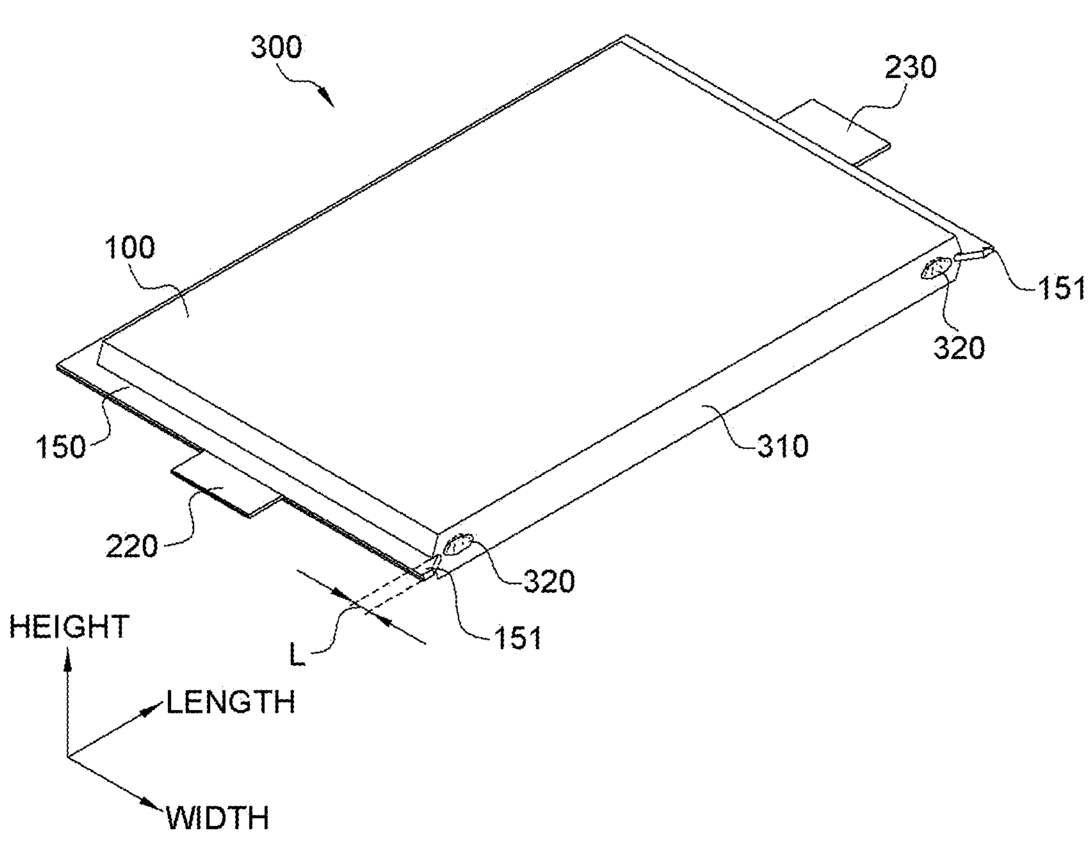
FIG. 8 is an assembled perspective view illustrating the secondary battery including the electrode assembly and the pouch case according to an embodiment of the present invention.

FIG. 7 is a cross-sectional view illustrating a secondary battery according to an embodiment of the present invention and FIG. 8 is an assembled perspective view illustrating the secondary battery including the electrode assembly and the pouch case according to an embodiment of the present invention.

Referring to FIGS. 7 and 8, the first partitioning part 130 may be unfolded in a state in which the secondary battery 300 is assembled and may be formed as the side surface part 310 of a flat plane form. In addition, a phenomenon in which the sealing parts 150 positioned on both ends of the side surface part 310 of the secondary battery 300 in the length direction are not folded or are dented after the secondary battery 300 is manufactured may be prevented.

In addition, a length of a cross section of an upper side surface of the first partitioning part 130 may be smaller than a sum of a depth A1 of the first receiving part 110 and a depth A2 of the second receiving part 120.

Here, the upper side surface of the first partitioning part 130 may be a surface toward the first receiving part 110 and the second receiving part 120, and referring to FIG. 6, the length of the cross section of the upper side surface of the first partitioning part 130 may be a sum B1+B2+B3 of a length B1+B2 of the pair of plane parts 132 and a length B3 of the curved part 131. Therefore, the length of the cross section of the upper side surface of the first partitioning part 130 may be formed to be A1+A2>B1+B2+B3. In addition, the sum A1+A2 of the depth A1 of the first receiving part and the depth A2 of the second receiving part may be equal to the thickness T of the electrode assembly, i.e., A1+A2=T. In this case, the sum A1+A2 of the depth A1 of the first receiving part and the depth A2 of the second receiving part may be slightly smaller or greater than the thickness T of the electrode assembly depending on the material or shape of the pouch case 100.

Therefore, since the first partitioning part 130 is pulled while being unfolded when the pouch case 100 is folded so that the electrode assembly 200 is received in the receiving space of the pouch case 100 when the secondary battery 300 is manufactured using the pouch case 100 according to an embodiment of the present invention, the first partitioning part 130 which becomes the side surface part 310 of the secondary battery 300 after manufacturing the secondary battery 300 may be formed as the side surface part 310 of a plane form in a state in which the secondary battery 300 is assembled.

Here, the height H1 of the first partitioning part 130 may be lower than the depths of the first receiving part 110 and the second receiving part 120, and may be ½ or more of the depths of the first receiving part 110 and the second receiving part 120. In addition, the height of the first partitioning part 130 may be preferably ⅔ or more, and more preferably ⅘ or more of the depths of the first receiving part 110 and the second receiving part 120. That is, when the height of the first partitioning part 130 satisfies the above-mentioned conditions, the shape of the first partitioning part 130 does not appear on the side surface part 310 of the secondary battery and the side surface part may be formed to be flat. In addition, since it is possible to prevent stress condensation on a folded side surface of the pouch case of the folded side surface, productivity, cooling efficiency and energy density of the secondary battery may all be increased.

In addition, the secondary battery 300 using the pouch case 100 according to the present invention may include the pouch case 100 according to the present invention and the electrode assembly 200, and the pouch case 100 is sealed along the sealing part 150 after the electrode assembly 200 is received in the receiving space formed by folding the sealing part 150 so that the first receiving part 110 and the second receiving part 120 face each other.

As shown, the first partitioning part 130 of the pouch case 100 uniformly forms the side surface part 310 of the secondary battery 300, and dimples 320 which are concave toward the inside of the secondary battery 300 may be formed at positions corresponding to the second partitioning part 141 and the third partitioning part 142 of both ends of the side surface part 310 of the secondary battery 300 in the length direction.

Figure 9:
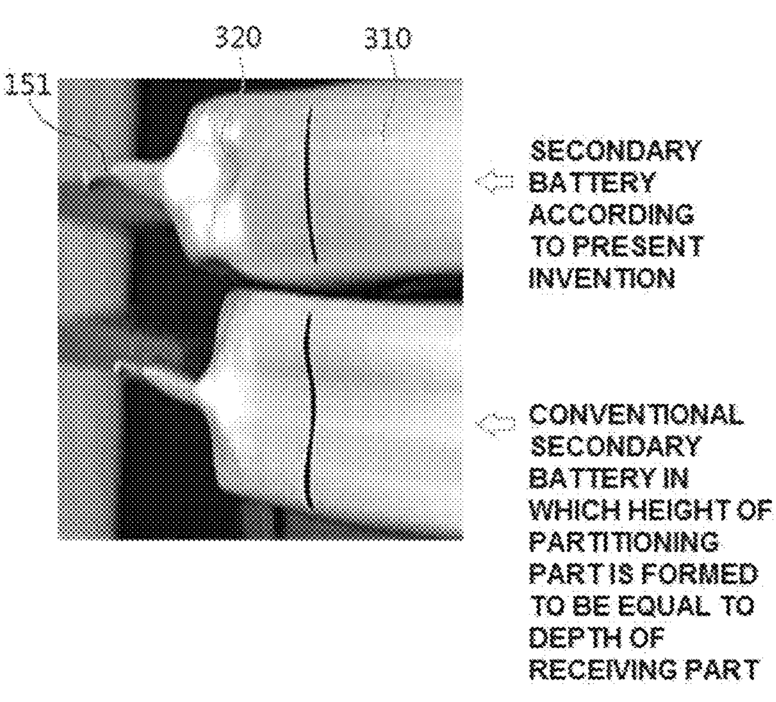
FIG. 9 is a photograph illustrating a portion in which an extending part and a dimple are formed in the secondary battery according to the present invention and a photograph comparing a conventional secondary battery in which a height of a partitioning part is formed to be equal to a depth of a receiving part.

FIG. 9 is a photograph illustrating a portion in which an extending part and a dimple are formed in the secondary battery according to the present invention and a photograph comparing a conventional secondary battery in which a height of a partitioning part is formed to be equal to a depth of a receiving part.

Referring to the photograph of FIG. 9, it may be seen that the secondary battery according to the present invention has the side surface part that does not have a concavely depressed portion as in an upper figure and has an end portion of the side surface part on which the dimple of a concave form is formed. On the other hand, the conventional secondary battery may have a concavely depressed portion which is present along the side surface part as in a lower figure.

The dimple 320 serves to guide the sealing parts 150 of both ends of the side surface part 310 when the pouch case 100 is folded, so that the sealing pars 150 may be easily folded, and the size and shape may be various according to the height or the width of the second partitioning part 141 which is appropriately adjusted according to the thickness T and the shape of the electrode assembly 200 or according to the material of the pouch case 100.

As shown, the secondary battery 300 using the pouch case 100 according to the present invention is characterized in that the side surface part 310 is not concavely recessed or does not protrude as a whole and has a flat and uniform form. Thereby, the secondary battery 300 according to the present invention may have high heat radiation efficiency with low thermal resistance because the side surface part 310 may be perfectly in close contact with the cooling plate 500 when the side surface part 310 is in contact with the cooling plate 500 to cool the side surface part 310.

In addition to this, since the side surface part 310 of the secondary battery 300 according to the present invention does not protrude and is uniformly formed, the side surface part 310 has a fold outwardly formed thereon or has a separating sealing portion. As a result, since the side surface part 310 occupies a smaller space for the same battery capacity than when the side surface part 310 protrudes, the secondary battery 300 according to the present invention may have high energy density.

In addition, the sealing parts 150 positioned at portions adjacent to both end portions of the side surface part 310 of the secondary battery 300 may include extending parts 151 protruding in a direction perpendicular to the side surface part 310 of the secondary battery 300 by a predetermined length in a process of folding the sealing parts 150 for packaging. Accordingly, a space may be formed between the extending part 151 and the side surface part 310 by a length L of the extending part 151.

The extending part 151 formed as described above may serve to maintain or fix an arrangement of the secondary battery 300 to the cooling plate 500 by forming a groove 520 or a step 510 capable of receiving the extending part 151 in a side surface of the cooling plate 500, when the secondary battery 300 according to the present invention and the cooling plate 500 are coupled to each other to manufacture a secondary battery pack.

FIGS. 10 to 18 are views illustrating first to third examples in which the secondary battery 300 according to the present invention and the cooling plate 500 are coupled to each other to configure the secondary battery pack.

Figure 10:
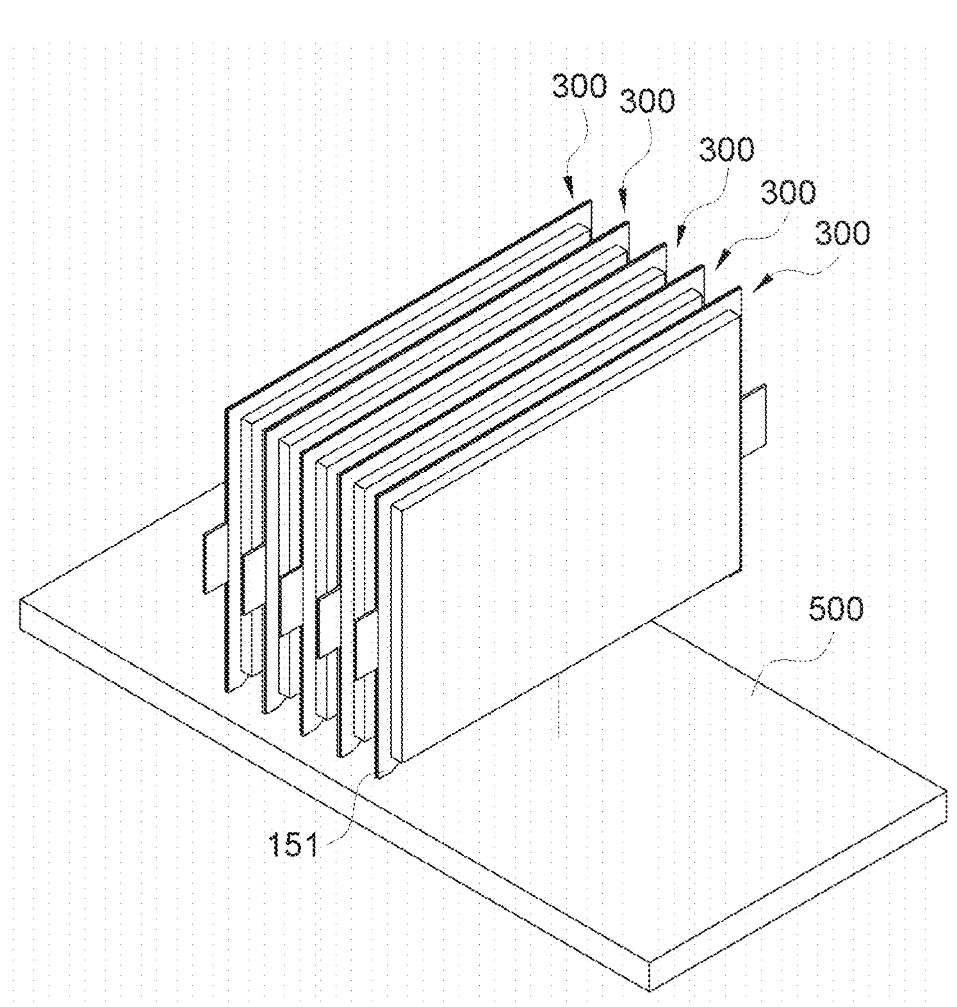
FIG. 10 is a view illustrating a first example in which a secondary battery pack is configured by coupling a secondary battery and a cooling plate according to the present invention to each other.
Figure 11:
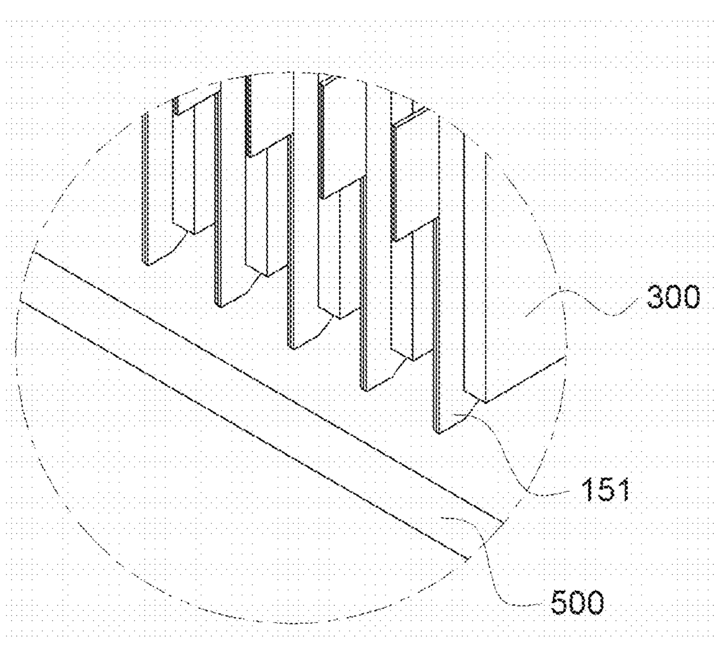
FIG. 11 is a partially enlarged view of FIG. 10.
Figure 12:
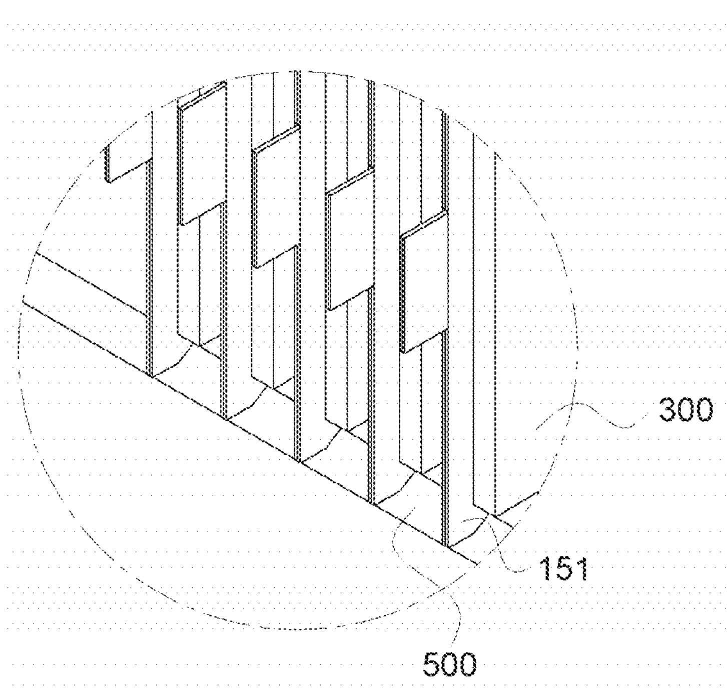
FIG. 12 is a partially enlarged view illustrating a state in which the secondary battery and the cooling plate are coupled to each other in FIG. 11.

First, FIGS. 10 to 12 are a view illustrating a first example of the secondary battery pack according to the present invention and enlarged detailed views thereof.

Referring to FIG. 10, a plurality of secondary batteries 300 according to the present invention may be disposed on the cooling plate 500 to configure the secondary battery pack. Here, the cooling plate 500 includes a first side surface, a second side surface opposing the first side surface, and an upper surface with which the side surface parts 310 of one or more secondary batteries 300 are in surface-contact.

According to the first example of the secondary battery pack shown in FIG. 10, a width between the first side surface and the second side surface of the cooling plate 500 may correspond to a length between the extending parts 151 of the secondary batteries 300. Referring to FIGS. 11 and 12, in this case, when the upper surface of the cooling plate 500 is in close contact with the side surface parts 310 of the secondary batteries 300, the cooling plate 500 may be inserted between the extending parts 151 of the secondary batteries 300.

By such a structure, the secondary battery 300 is limited from moving in the length direction of the secondary battery 300 to prevent a position thereof from being separated from the cooling plate 500, and the arrangement between the secondary battery 300 and the cooling plate 500 may be maintained.

Figure 13:
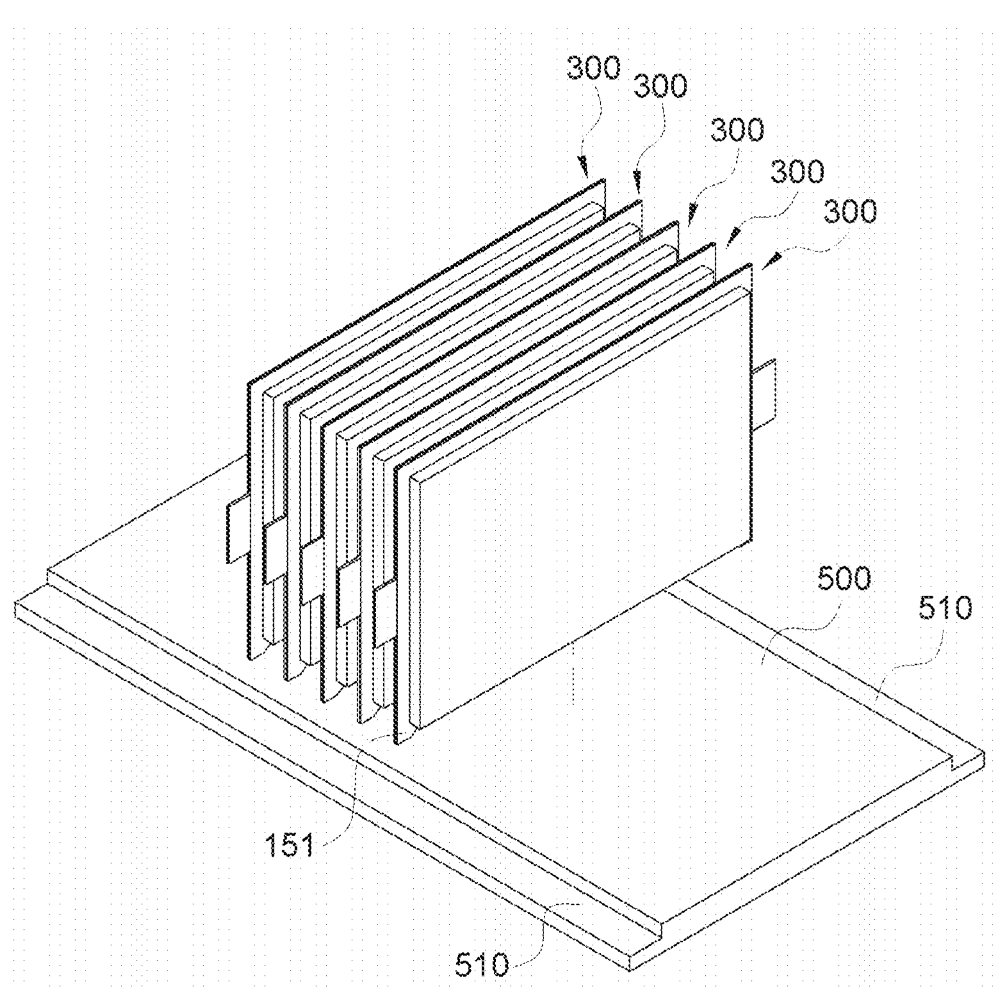
FIG. 13 is a view illustrating a second example in which a secondary battery pack is configured by coupling a secondary battery and a cooling plate according to the present invention to each other.
Figure 14:
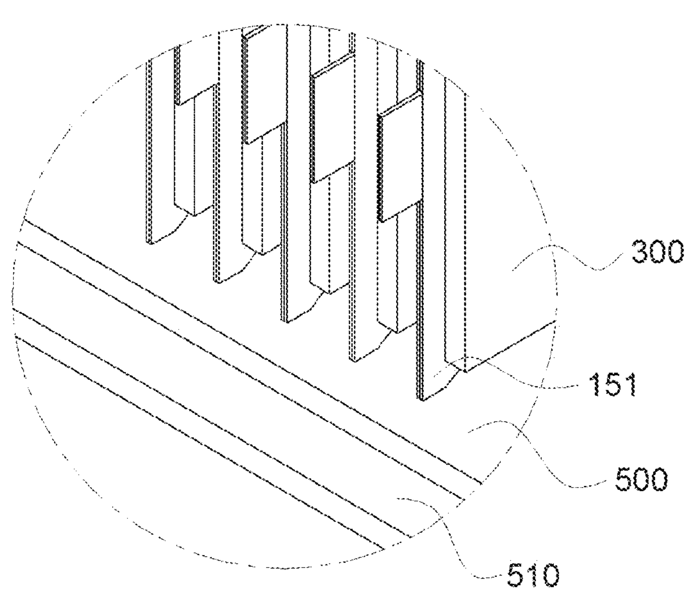
FIG. 14 is a partially enlarged view of FIG. 13.
Figure 15:
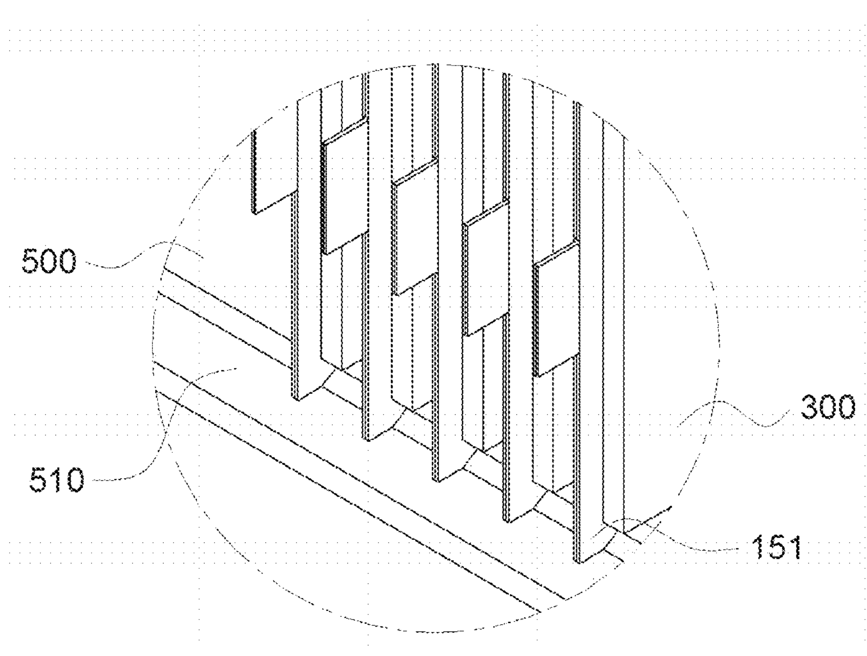
FIG. 15 is a partially enlarged view illustrating a state in which the secondary battery and the cooling plate are coupled to each other in FIG. 14.

FIGS. 13 to 15 are a view illustrating a second example of the secondary battery pack according to the present invention and enlarged detailed views thereof.

According to the second example of the secondary battery pack shown in FIG. 13, a width between the first side surface and the second side surface of the cooling plate 500 may be greater than a length between the extending parts 151 of the secondary batteries 300, and each of the first side surface and the second side surface of the cooling plate 500 may be formed with a step 510 at a height which is greater than or equal to a predetermined protruded length of the extending part 151 of the secondary battery 300. Referring to FIGS. 14 and 15, when the upper surface of the cooling plate 500 is in close contact with the side surface parts 310 of the secondary batteries 300, the extending parts 151 of the secondary batteries 300 may be placed on a step portion formed on the cooling plate 500.

By such a structure, the secondary battery 300 is limited from moving in the length direction of the secondary battery 300 to prevent a position thereof from being separated from the cooling plate 500, and the arrangement between the secondary battery 300 and the cooling plate 500 may be maintained. In addition to this, a width of the cooling plate 500 of the secondary batter pack according to the second example is more extended than the width of the cooling plate 500 according to the first example, thereby further increasing the cooling efficiency.

Figure 16:
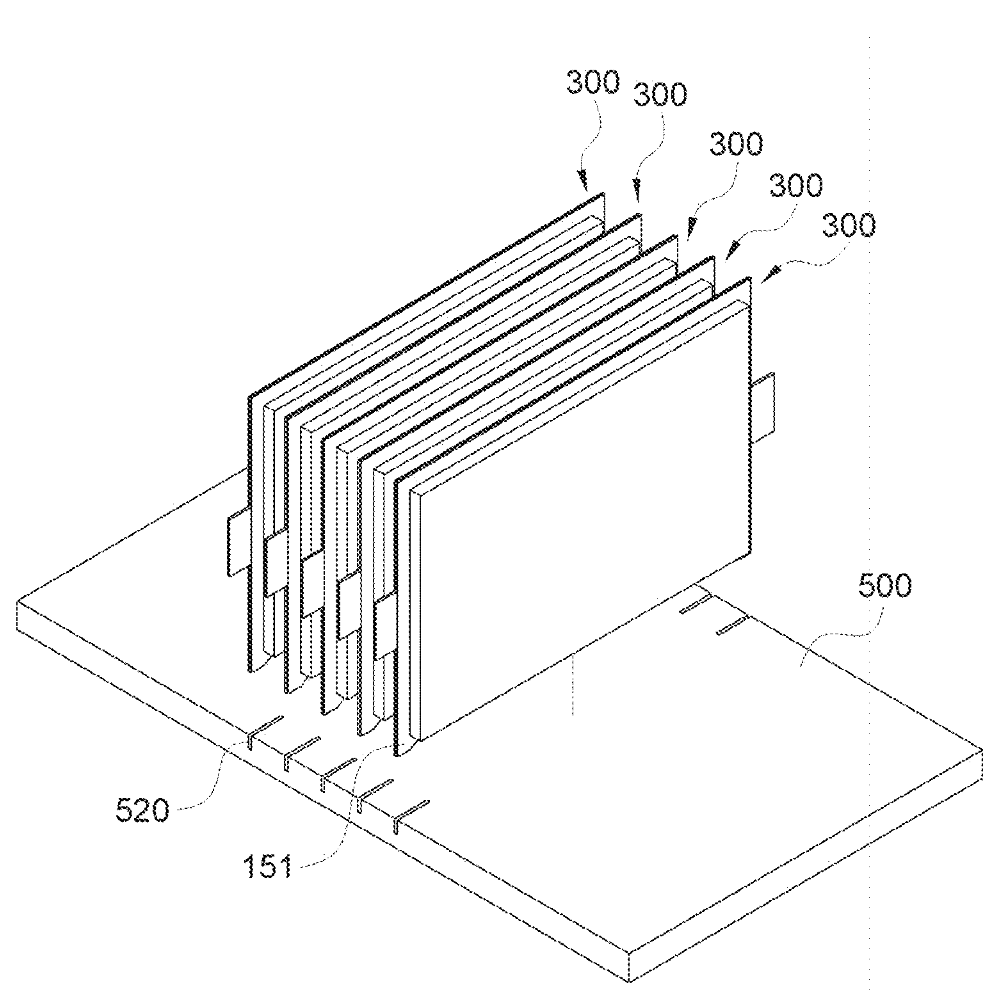
FIG. 16 is a view illustrating a third example in which a secondary battery pack is configured by coupling a secondary battery and a cooling plate according to the present invention to each other.
Figure 17:
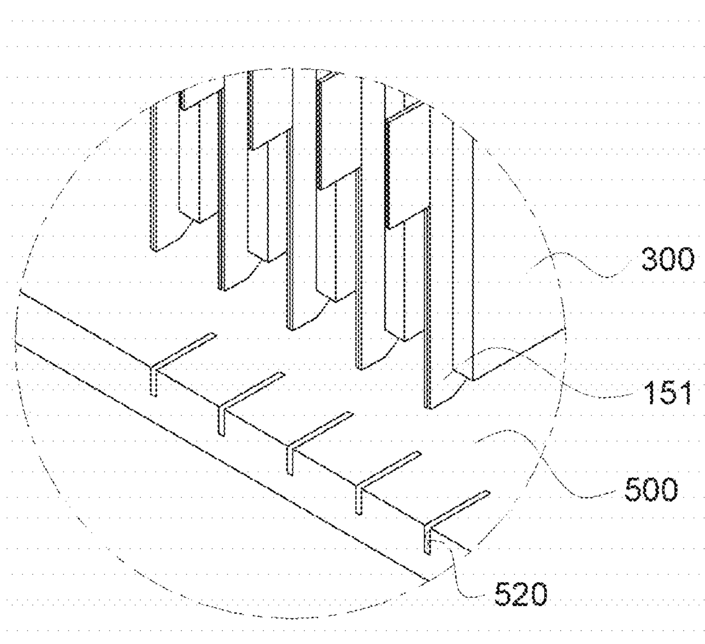
FIG. 17 is a partially enlarged view of FIG. 16.
Figure 18:
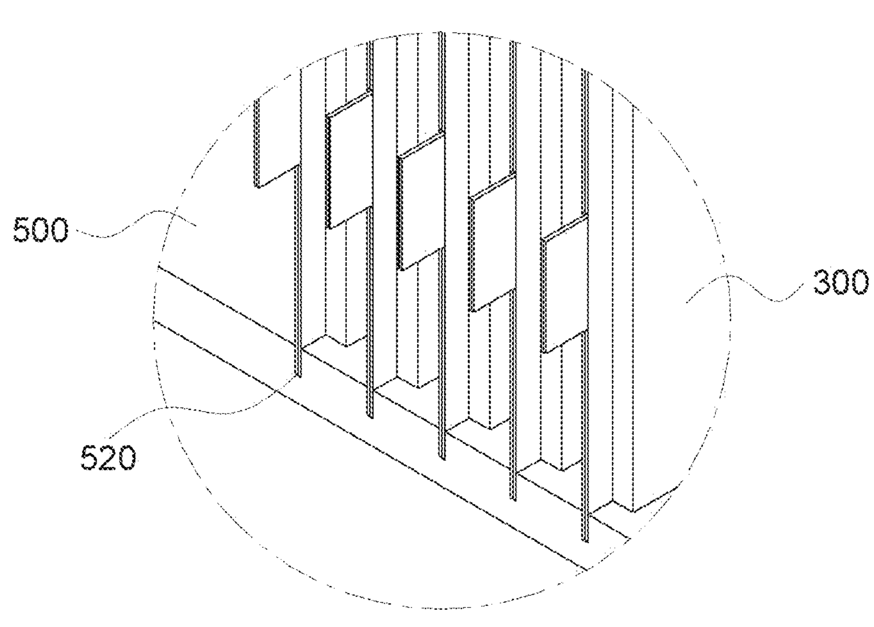
FIG. 18 is a partially enlarged view illustrating a state in which the secondary battery and the cooling plate are coupled to each other in FIG. 17.

FIGS. 16 to 18 are a view illustrating a third example of the secondary battery pack according to the present invention and enlarged detailed views thereof.

According to the third example of the secondary battery pack shown in FIG. 16, a width between the first side surface and the second side surface of the cooling plate 500 may be greater than a length between the extending parts 151 of the secondary batteries 300, and each of the first side surface and the second side surface of the cooling plate 500 may be formed with one or more grooves 520 at a depth which is greater than or equal to a predetermined length of the extending part 151 so as to receive the extending parts 151 of the secondary batteries 300. Referring to FIGS. 17 and 18, when the upper surface of the cooling plate 500 is in close contact with the side surface parts 310 of the secondary batteries 300, the extending parts 151 of the secondary batteries 300 may be received in the grooves 520 formed in the cooling plate 500.

By such a structure, the secondary battery 300 is limited from moving in the length direction of the secondary battery 300 and a direction perpendicular thereto to prevent a position thereof from being separated from the cooling plate 500, and the arrangement between the secondary battery 300 and the cooling plate 500 may be maintained. In addition to this, a width of the cooling plate 500 of the secondary batter pack according to the third example is more extended than the width of the cooling plate 500 according to the first example, thereby further increasing the cooling efficiency.

Referring to FIGS. 10 to 18, in the secondary battery pack according to the present invention, the side surface part 310 of each of the plurality of secondary batteries 300 disposed on the cooling plate 500 may be disposed to be in close contact with the cooling plate 500 to perform heat radiation of the secondary batteries 300, and by the extending parts 151 protruding from the side surface parts 310 of the secondary batteries 300 by the predetermined length, the secondary batteries 300 may be limited from moving in the length direction of the secondary batteries 300 with respect to the cooling plate 500 to prevent the positions thereof from being separated from the cooling plate 500, and the arrangement between the secondary battery 300 and the cooling plate 500 may be maintained.

In the pouch case and the secondary battery using the same according to the present invention, one side surface of the secondary battery may be in close contact with the cooling plate to maximize the cooling efficiency by allowing one side surface of the secondary battery to have the perfect cooling structure.

Hereinabove, while the present invention has been described and shown with reference to the embodiments for illustrating the principle of the present invention, the present invention is not limited to the shown and described configurations and actions. It will be understood by those skilled in the art that the present invention may be embodied in other specific forms without departing from the spirit or essential characteristics thereof. Therefore, it is to be understood that the embodiments described hereinabove are illustrative rather than being restrictive in all aspects. It is to be understood that the scope of the present invention will be defined by the claims, and all modifications and alternations derived from the claims and their equivalents are included in the scope of the present invention.

| [Detailed Description of Main Elements] |
| --- |
| 100: pouch case |
| 110: first receiving part |
| 120: second receiving part |
| 130: first partitioning part |
| 131: curved part |
| 132: plane part |
| 141: second partitioning part |
| 142: third partitioning part |
| 150: sealing part |
| 151: extending part |
| L: length of extending part |
| 200: electrode assembly |
| 220: first electrode tab |
| 230: second electrode tab |
| 300: secondary battery |
| 310: side surface part |
| 320: dimple |
| 500: cooling plate |
| 510: step |
| 520: groove |

What is claimed is:

1. A pouch case for receiving and packaging an electrode assembly, the pouch case comprising:

a first receiving part and a second receiving part which are concavely formed and arranged in a width direction;

a sealing part formed along an outer portion of the pouch case so as to surround the first receiving part and the second receiving part; and a partitioning part formed between the first receiving part and the second receiving part and protruding from a bottom surface of each receiving part and extending in a length direction intersecting the width direction to partition the first receiving part and the second receiving part, wherein the partitioning part includes:

a first partitioning part having an upper end having a height lower than that of the sealing part and partitioning the first receiving part and the second receiving part at a middle of the partitioning part; and second partitioning parts each extending from both ends of the each receiving part in the length direction toward the first partitioning part, and wherein the first partitioning part and the second partitioning parts are arranged along the length direction, wherein a length of a cross section of an upper side surface of the first partitioning part is smaller than a sum of a depth of the first receiving part and a depth of the second receiving part.

2. The pouch case of claim 1, wherein a height of the first partitioning part is lower than depths of the first receiving part and the second receiving part, and the height of the first partitioning part is ½ or more of the depths of the first receiving part and the second receiving part.

3. The pouch case of claim 1, wherein a height of the first partitioning part is lower than depths of the first receiving part and the second receiving part, and the height of the first partitioning part is ⅔ or more of the depths of the first receiving part and the second receiving part.

4. A secondary battery including a pouch case and an electrode assembly, wherein the pouch case includes:

a first receiving part and a second receiving part which are concavely formed and arranged in a width direction;

a sealing part formed along an outer portion of the pouch case so as to surround the first receiving part and the second receiving part; and a partitioning part formed between the first receiving part and the second receiving part and protruding from a bottom surface of each receiving part and extending in a length direction intersecting the width direction to partition the first receiving part and the second receiving part, wherein the partitioning part includes:

a first partitioning part having an upper end having a height lower than that of the sealing part and partitioning the first receiving part and the second receiving part at a middle of the partitioning part; and second partitioning parts each extending from both ends of the each receiving part in the length direction toward the first partitioning part, and wherein the first partitioning part and the second partitioning parts are arranged along the length direction, wherein a length of a cross section of an upper side surface of the first partitioning part is smaller than a sum of a depth of the first receiving part and a depth of the second receiving part, and the electrode assembly is received and packaged in a receiving space formed by folding along the partitioning part so that the first receiving part and the second receiving part of the pouch case face each other.

5. The secondary battery of claim 4, wherein the first partitioning part is unfolded and is formed as a side surface part of a plane form, and the sealing part includes extending parts protruding in a direction perpendicular to the side surface part of the secondary battery at portions adjacent to both ends of the side surface part of the secondary battery.

6. The secondary battery of claim 4, wherein the first partitioning part is unfolded and is formed as a side surface part of a plane form, and dimples of a concave form are formed at both ends of the side surface part.

7. A secondary battery pack comprising:

one or more secondary batteries of claim 4; and a cooling plate including a surface which is in surface contact with side surface parts of the secondary batteries.

8. The secondary battery pack of claim 7, wherein the sealing part includes extending parts protruding in a direction perpendicular to the side surface parts of the secondary batteries at portions adjacent to both ends of the side surface parts of the secondary batteries.

* * * * *